US006736417B1

(12) United States Patent
Whitmire

(10) Patent No.: US 6,736,417 B1
(45) Date of Patent: May 18, 2004

(54) MOUNTAIN CHAIR APPARATUS AND METHOD FOR TRANSPORTING A HANDICAPPED PERSON OVER MOUNTAINOUS TERRAIN

(76) Inventor: Ward Whitmire, 702 N. 48th Ave., Yakima, WA (US) 98908

( * ) Notice: Subject to any disclaimer, the term of this patent is extended or adjusted under 35 U.S.C. 154(b) by 981 days.

(21) Appl. No.: 08/646,530

(22) Filed: May 10, 1996

(51) Int. Cl.[7] .................................................. B62B 7/02
(52) U.S. Cl. ...................................................... 280/47.3
(58) Field of Search .......................... 280/47.3, 47.315, 280/47.32, 78, DIG. 11, 655.1, 652; 297/484, DIG. 4; 180/65.5, 65.1, DIG. 906

(56) References Cited

U.S. PATENT DOCUMENTS

| | | | | | |
|---|---|---|---|---|---|
| 404,767 | A | | 6/1889 | Botkin | 297/403 |
| 2,715,030 | A | | 8/1955 | Peterson | 280/30 |
| 3,038,174 | A | | 6/1962 | Brown et al. | 297/359 |
| 3,055,449 | A | * | 9/1962 | Murphy | 280/47.3 |
| 3,328,046 | A | * | 6/1967 | Drew | 280/47.3 |
| 3,820,807 | A | * | 6/1974 | Curran | 280/47.3 |
| 3,848,883 | A | | 11/1974 | Breacain | 280/5.32 |
| 3,907,323 | A | * | 9/1975 | Knapp | 280/47.3 |
| 4,171,139 | A | * | 10/1979 | Cockram | 280/652 |
| 4,278,387 | A | | 7/1981 | Seguela | 414/462 |
| 4,405,142 | A | | 9/1983 | Whetstine | 280/242 |
| 4,444,405 | A | * | 4/1984 | Barrus | 280/47.3 |
| 4,565,385 | A | | 1/1986 | Morford | 280/289 |
| 4,592,570 | A | | 6/1986 | Nassiri | 280/650 |
| 4,695,072 | A | | 9/1987 | Brooks | 280/650 |
| 4,711,487 | A | | 12/1987 | Brooks | 297/183 |
| 4,963,762 | A | | 10/1990 | Brooks | 297/183 |
| 5,160,156 | A | | 11/1992 | Mendon | 280/250.1 |

OTHER PUBLICATIONS

Pac' Orse product Brochure, Pac' Orse Systems, Inc.
"Litter Wheel and Frame," PMI Ropes & Accessories 1994 Catalog & Equipment Guide, p. 32.
"Trial Buddy I" advertisement, Sports 'n Spokes, vol. 22, No. 1, Jan./Feb. 1996, p. 36.
"Mogul Master" advertisement, Sports 'n Spokes, vol. 20 No. 3, Sep./Oct. 1994, p. 52.
"All–terrain Wheelchair," Sports 'n Spokes, vol. 20 No. 3, Sep./Oct. 1994 p. 82.
"The Phoenix Rises," Sports 'n Spokes, vol. 21 No. 3, May/Jun. 1995, p. 79.
"Off–road Wheelchair," Sports 'n Spokes, vol. 21 No. 3, May/Jun. 1995, p. 96.
"Roleez All Terrain Spot Wheeler" advertisement, New Mobility, vol. 6 No. 26, Nov. 1995, p. 21.

* cited by examiner

*Primary Examiner*—Paul N. Dickson
*Assistant Examiner*—C. T. Bartz
(74) *Attorney, Agent, or Firm*—Stratton Ballew PLLC

(57) ABSTRACT

A chair situated upon a single wheel in such a relationship to achieve a low center of gravity. The chair is secured between parallel elongated handle members, extending from the front to the back of the chair which enables the safe transportation of a handicapped person and cargo by two other people over rugged terrain where conventional devices for handicapped individuals are unsuitable. The chair is convertible to a four-wheeled chair which makes it practical to use for camping trips in the wilderness.

13 Claims, 9 Drawing Sheets

MOUNTAIN CHAIR APPARATUS AND METHOD FOR TRANSPORTING A HANDICAPPED PERSON OVER MOUNTAINOUS TERRAIN

BACKGROUND OF THE INVENTION

The present invention relates generally to an apparatus and method for transporting a handicapped person. More specifically, the present invention relates to an apparatus particularly suited for safely transporting handicapped persons over rugged terrain that has, in the past, been impassable in conventional wheelchair devices.

Today's high-tech wheelchairs and motorized scooters provide autonomy to handicapped persons, which has simply been unavailable to previous generations. Further, with new laws governing wheelchair access, going in and out of structures is easier than ever. But it is still difficult to get outdoors where mud, dirt, rocks and steep slopes prevail.

In many wilderness situations involving roadless backcountry, off road accessibility issues arise for individuals confined to a wheelchair. For instance, terrain consisting of rough surfaces, rocky inclines, steep switchbacks, sidehills, snowy trails, while providing beautiful vistas and outdoor recreation for nondisabled individuals, makes these backcountry areas an unaccessible destination for the handicapped population.

Prior to the present invention, travel over topography impassable in a traditional wheelchair was simply not possible. Instead, handicapped individuals were limited to highly developed recreation settings for accessible outdoor recreation.

Conventional devices for transporting disabled individuals are unsuitable for use over rough terrain and wilderness travel. Use of all-terrain bikes and wheelchairs, three-wheeled units, and wheeled carts has been attempted with little success. Due to a high center of gravity, the conventional devices have prevented access to outdoor recreation facilities and programs involving rough, mountainous terrain due to safety concerns. More specifically, the multiple-wheeled devices and devices having a high center of gravity are prone to tipping over which could lead to serious injury or even fatal consequences in the backcountry and mountainous terrain.

Accordingly, a need exists for an improved apparatus providing safe, comfortable, affordable and highly maneuverable (steerable) travel to enable handicapped individuals access to the great outdoors and mountainous terrain.

SUMMARY OF THE INVENTION

The present invention provides a mountain chair and a method for safely transporting disabled persons and cargo over difficult mountainous terrain. For the disabled person, the present invention provides new challenges and opportunities for personal growth, by removing barriers that previously existed, hereby providing unexpected freedom that can enhance a handicapped individual's life, boost self-esteem and enable them to have an enjoyable wilderness experience. Moreover, backcountry travel can be therapy for some handicapped individuals, and a way of life for others.

Pursuant to the invention, the mountain chair includes a frame that encases a chair; a pair of elongated handle members that are mounted on opposite sides of and secured to the frame which function as safety rails; a wheel located below the chair; a footrest; and a means for stopping the mountain chair.

In an embodiment, the mountain chair includes a disc mounted to the wheel and at least one caliper mounted on a wheel frame, actuated by a lever located at an end of the elongated member.

In an embodiment, the wheel is slidably mounted on a rail, located below the chair. In a further embodiment, the wheel is an all terrain vehicle tire, rigidly mounted.

In an embodiment, the chair is constructed from plastic. In a further embodiment, the chair is bucket-shaped.

In an embodiment, the elongated handle members are removably attached and adjustable.

In an embodiment, an extendable back rest is attached to the frame.

In an embodiment, a pair of elongated handle member extensions are removably attached to a distal end portion of the elongated handle members.

The invention also provides a method for transporting handicapped and disabled persons safely over mountainous terrain comprising the steps of: placing a handicapped person in a mountain chair apparatus having a chair with a low center of gravity, a pair of elongated handle members extending forwardly and backwardly from the chair, the elongated handle members having a front end and a back end, and a wheel located below the chair; locating a first operator at the front end of the elongated handle members; gripping the front end of the elongated handle members by the first operator; gripping the back end of the elongated handle members by a second operator; lifting the mountain chair apparatus containing the handicapped person by having the first operator raise the front end of the elongated handle members with the mountain chair apparatus behind the first operator and the second operator raise the back end of the elongated handle members with the mountain chair apparatus in front of the second operator simultaneously; and leading the mountain chair apparatus by having the first operator walk forward and the second operator follow in the same direction.

In an embodiment, the method further comprises the step of braking the mountain chair apparatus by having one or more persons selected from the group consisting of the first operator, the second operator and the handicapped person, squeeze a lever for slowing or stopping the wheel.

It is, therefore, an advantage of the present invention to provide a mountain chair for transporting disabled individuals across mountainous terrain.

Another advantage of the present invention is to provide a mountain chair for transporting cargo across difficult and mountainous terrain.

A further advantage of the present invention is to provide a mountain chair with a low center of gravity to eliminate the tendency for tipping over and dangerous accidents while traveling up and down hills.

An additional advantage of the present invention is to provide a method for safely transporting a handicapped or disabled person over mountainous terrain.

A still further advantage of the present invention is to provide a mountain chair that is less likely to cause operator fatigue due to the positioning of the elongated members for maximum leverage.

Additional features and advantages of the present invention are described in and will be apparent from the detailed description of the presently preferred embodiments and from the drawings.

DETAILED DESCRIPTION OF THE PRESENTLY PREFERRED EMBODIMENTS

Figure 1:
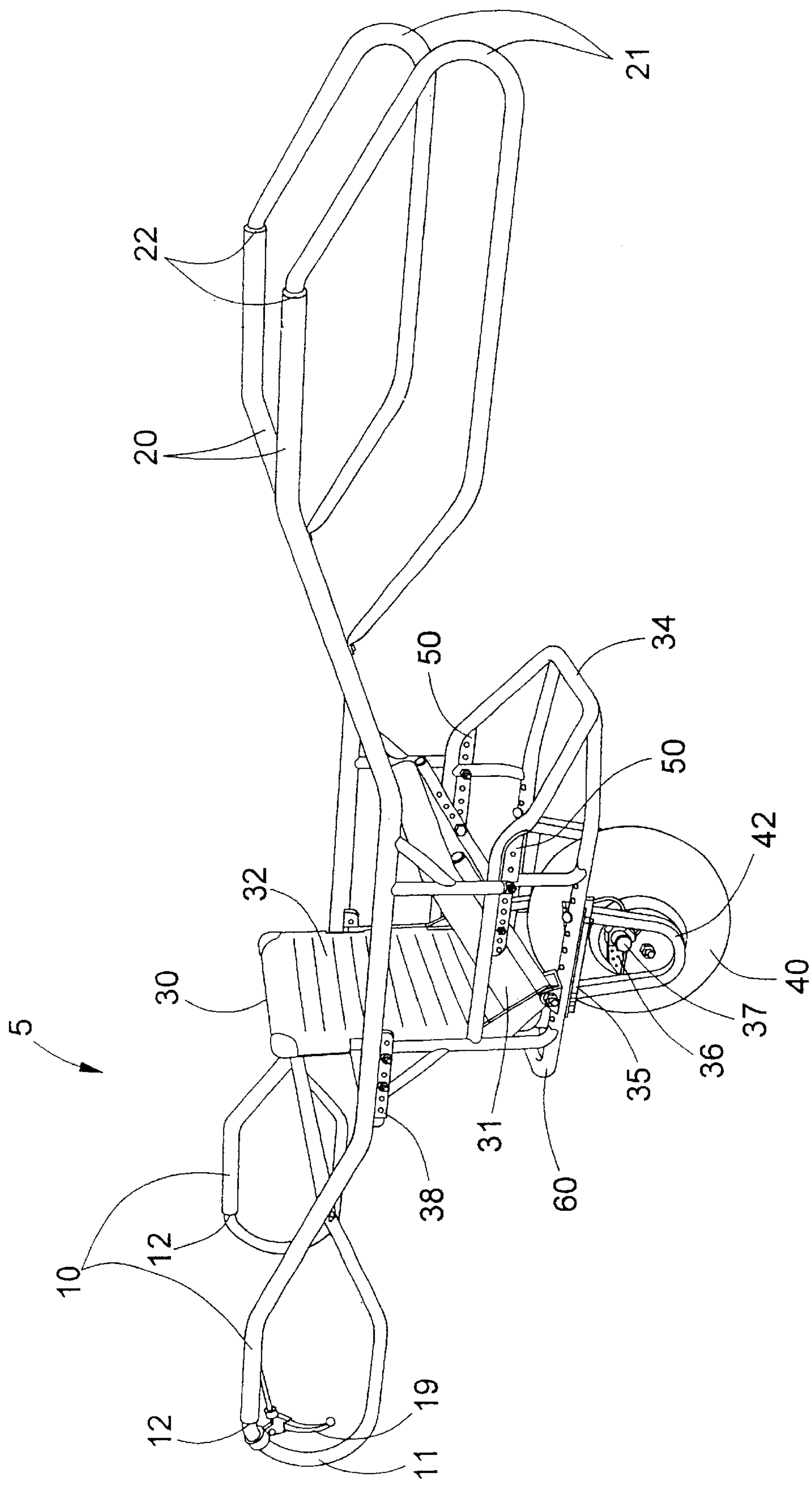
FIG. 1 is a perspective view of the mountain chair for transporting disabled and handicapped persons in accordance with a preferred embodiment of the invention.

The present invention provides a mountain chair for transporting people and cargo over difficult terrain. Although in the preferred embodiment the mountain chair is designed for wheelchair sports and recreation applications, it should be appreciated that the mountain chair of the present invention can be used in a variety of applications and can even be motorized. Pursuant to the invention and according to FIGS. 1 through 4, in an embodiment, the mountain chair 5 includes a pair of elongated back and front handle members designated generally by the numerals 10 and 20 respectively, which are arranged in parallel spaced relation, mounted on opposite sides of and secured to a frame 60. A chair 30 having a seat portion 31 and a back portion 32 is encased by the frame and situated within the frame as will be described subsequently so that the elongated handle members function as protective rails. A wheel 40 is positioned below the chair and is situated to provide a low center of gravity. A means for slowing and stopping the mountain chair is also provided. Referring to the drawings FIGS. 1 through 4, a mountain chair 5 is illustrated, that enables a disabled or handicapped person to safely and comfortably travel, with assistance, over terrain otherwise inaccessible to conventional wheelchair devices. With mininimal practice, two fairly physically fit volunteer operators can easily and safely transport a handicapped person over moderately difficult trails. Further, with the addition of at least one spotter for safety, extremely difficult and steep trails can be traversed.

Elongated back handle members 10 and elongated front handle members 20 are used by two people to help support a person seated in the mountain chair 5. The elongated handle members include elongated back handle member extensions 11 and elongated front handle member extensions 21 located at a distal back end portion 12 and a distal front end portion 22 of the elongated handle members. The back and front elongated handle members 10 and 20 are arranged in parallel spaced relation and are mounted on opposite sides of and secured to the frame 60.

A chair 30 is encased by a frame 60. Although the frame can be made from various materials, aluminum and chromium molybdenum alloy function satisfactorily.

Figure 3:
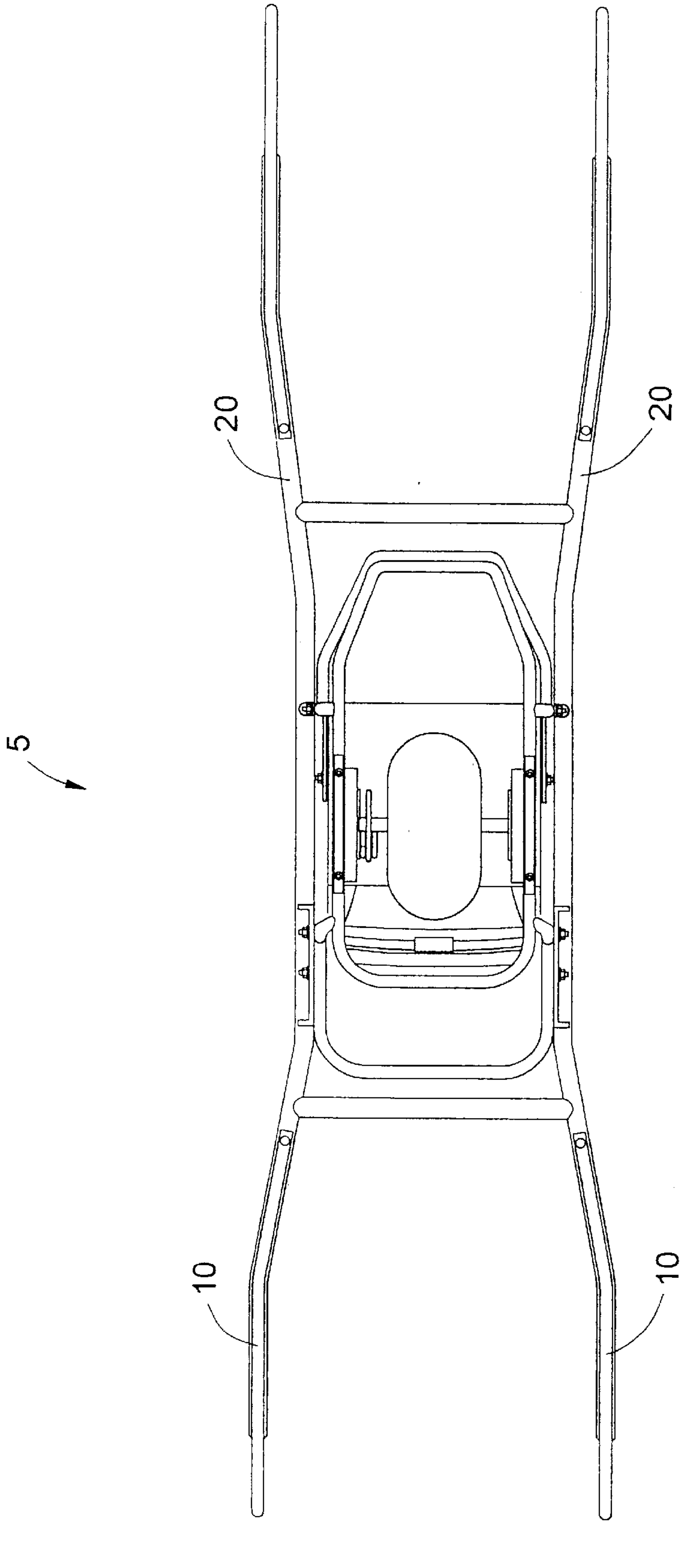
FIG. 3 is a bottom view of an embodiment of the mountain chair.
Figure 4:
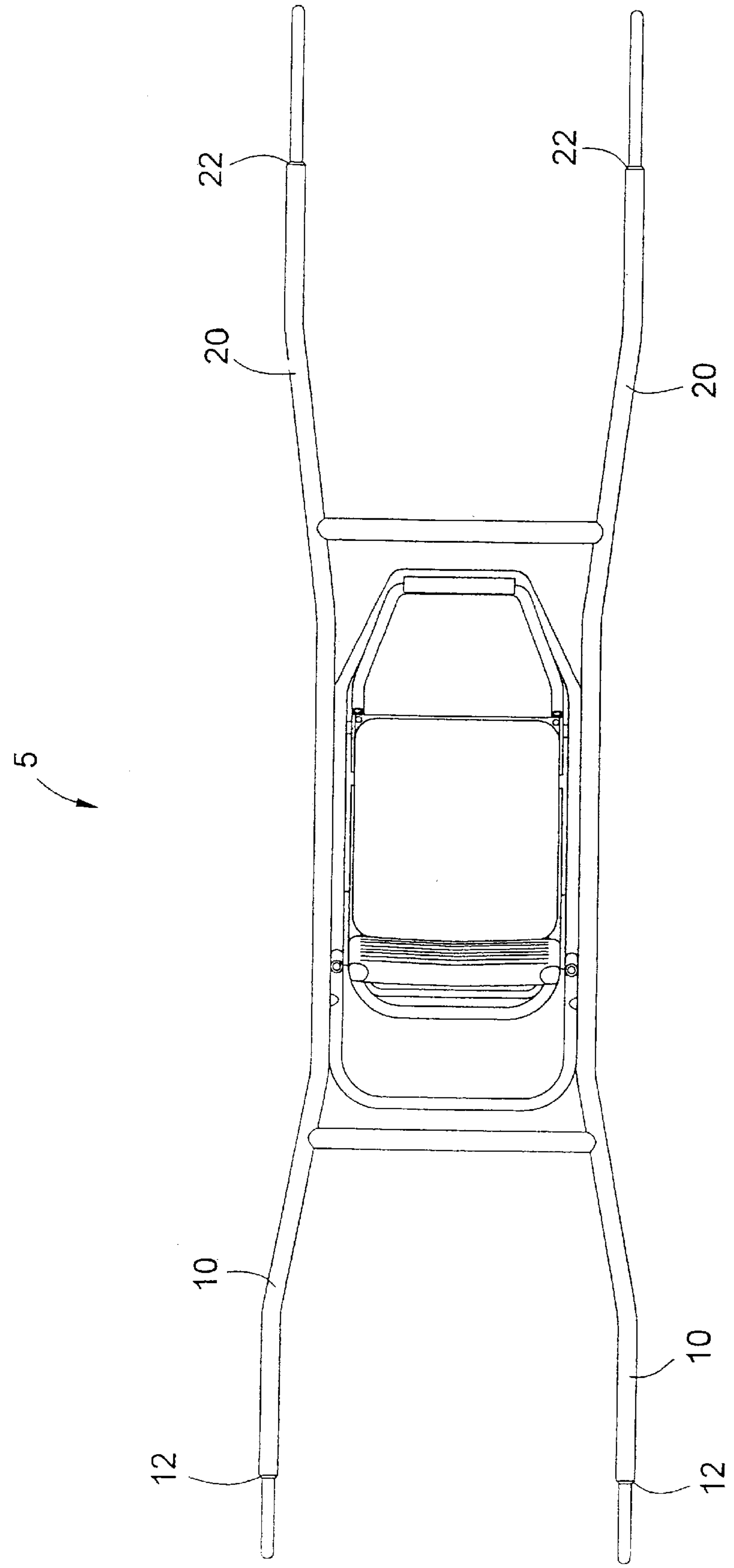
FIG. 4 is a plan view of an embodiment of the mountain chair.

The back and front elongated handle members 10 and 20 are adjustable fore and aft at the points of attachment to the frame 60, which are the distal back end portion 12 and the distal front end portion 22. This allows the operator to adjust the "lead" and "trail" functions respectively. The lead function requires a first operator to pull the mountain chair 5, thus providing the steering of the mountain chair. The trail function requires a second operator to follow the first (lead) operator. Additionally, for the operators' comfort, size, strength and personal preference, the back and front elongated handle member extensions 11 and 21 are removable in an embodiment as shown in FIGS. 3 and 4, and can be substituted with other shapes and sizes as in FIGS. 1 and 2.

Figure 2:
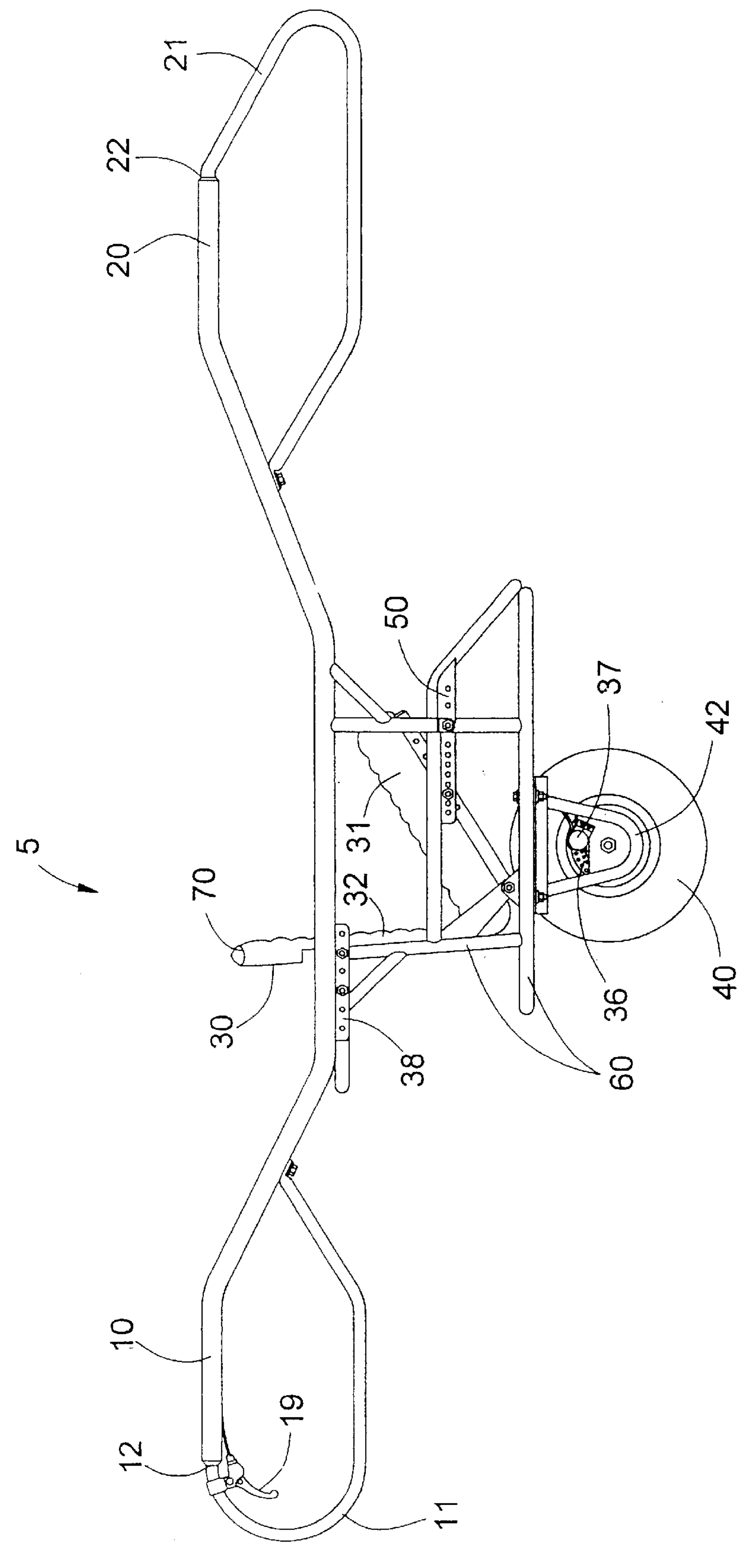
FIG. 2 is a side view of the mountain chair.

By way of example and not limitation, the extensions 11 and 22, as shown in FIGS. 1 and 2, allow the operators to lift the rider in the mountain chair 5 over obstacles with less exertion due to the shape of the extensions as shown.

The chair 30 is situated within the frame 60 such that a low center of gravity is achieved, and the elongated handle members function as protective railing, thus enclosing the passenger within the frame. The seat portion 31 and the back portion 32 may be constructed from a fiberglass or "poly" bucket seat which simplifies the seat structure. Adapted backrests (quad backs) (not shown) can also be attached to the back portion 32 of the chair to prevent individuals with little torso control from falling backwards.

As seen in FIGS. 1 and 2, the chair 30 is adjustably attached to the frame 60 by removable bolts to a bracket 38 and a hemispherical bracket 50 which are attached to the frame in an embodiment. Other attachment methods are also envisioned.

A wheel 40 is positioned centrally below the seat portion 31 of the chair 30, as shown in FIGS. 1 and 2. The wheel 40 is adjustably attached through use of a wheel frame 42 to the chair 30 to accommodate different types of terrain as well as passengers of different body weight. Although the wheel can be rigidly mounted to the chair, in the preferred embodiment, the wheel is slidably mounted on a rail 35 located on the frame 60, below the seat portion in such a way as to provide an adjustable center of gravity (see FIG. 1). In this way, the center of gravity can be adjusted for either up-hill or down-hill terrain as well as for different body weights. An adjustable foot rest 34, as shown in FIG. 1, is also provided which is a forward extension of the frame. The foot rest can be adjusted to suit the physical needs of the rider.

The wheel 40 can be moved forwards or backwards as needed to keep the rider centered over the wheel on steep ascents and descents. In addition to adjusting the wheel by way of the wheel frame 42, the pressure of the wheel can be adjusted. For example, lowering the pressure enables the rider to experience a soft ride while the mountain chair maintains good traction on side hills. Likewise, the pressure can be raised on smoother surfaces to decrease the rolling resistance.

Furthermore, it has also been determined that using a low pressure, all-terrain tire, mounted rigidly, is the best way of "suspending" the mountain chair. It allows the chair to be mounted closely to the tire, resulting in the lowest possible center of gravity. Therefore, as opposed to prior all-terrain wheelchairs and devices, the center of gravity of the present invention remains low for optimum control, maneuverability, steering, balance and safety.

Although it is contemplated by the inventor of the present invention that the wheel can vary in design, size, weight and tread, an all-terrain vehicle tire with a radius of 20 inches has been found to function satisfactorily.

As seen in FIGS. 1 and 2, a means for stopping the mountain chair 5 is provided. In a preferred embodiment, the means for stopping includes a disc 36 mounted to the wheel 40 as shown in FIGS. 1 and 2 and a caliper 37 mounted on the wheel frame 42 which is actuated by at least one lever 19 at the distal back end portion 12 of the back elongated handle members 10. Of course, for the operators' convenience, the lever(s) can be located at the distal front end portion 22 of the front elongated handle members 20 in addition to or instead of the lever(s) being located on the back elongated handle members as shown in FIGS. 1 and 2. Alternatively, a lever, e.g. a bar type lever (not shown) or whatever is required depending on the disability, may be set up for the rider. In this way, on long descents, having such lever accessible to the rider allows the rider to slow the mountain chair as needed without the operators having to keep a constant grip on the brake lever(s). It also allows the rider to take part in the operation and feel a sense of control over the mountain chair. Of course, it is contemplated by the inventor that other brake systems may be employed.

In FIG. 2, a side view of the mountain chair 5 is illustrated in accordance with the preferred embodiment of the present invention. The mountain chair is shown with the addition of an extendable back rest 70. The back rest is secured directly to the chair 30. Adjustability for rider comfort consists of an adjustable seat portion 31 and back portion 32 as discussed previously, and adjustable backrest angles. Moreover, if desired, a roll bar (not shown) can be affixed to the top of the frame 60 to offer protection in the case of an accident. It is further envisioned that a roll bar (not shown) may also lend itself to the mounting of a rain cover (not shown).

Other rider oriented options include an integral "rider sack" (not shown) which would zip up over the rider. The bottom half of the rider sack resembles a sleeping bag. The top half of the rider sack resembles a storm coat with sleeves and a hood. The rider sack could be constructed out of a water proof, breathable material such as Gore-Tex™. Additionally, the "rider sack" could have an insertable layer of insulation for cold weather. Lastly, there is ample space below and behind the seat portion of the chair to accommodate the storage of accessible items such as tools, guns, ropes, pulleys, food, water and other essentials for the back country. It is likely that custom packs will be designed for this purpose.

Figure 5A:
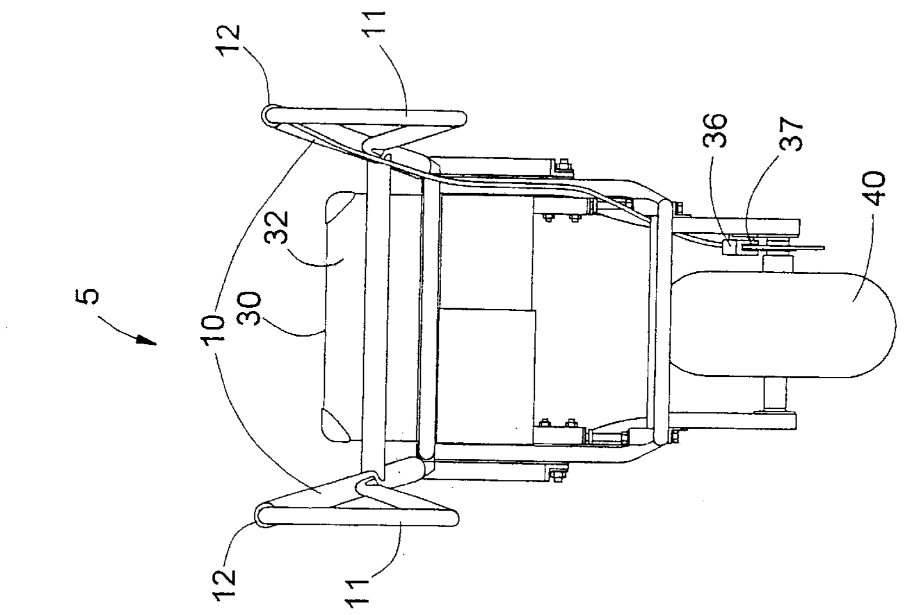
FIG. 5A is a back view of the mountain chair in accordance with an embodiment of the invention.
Figure 5B:
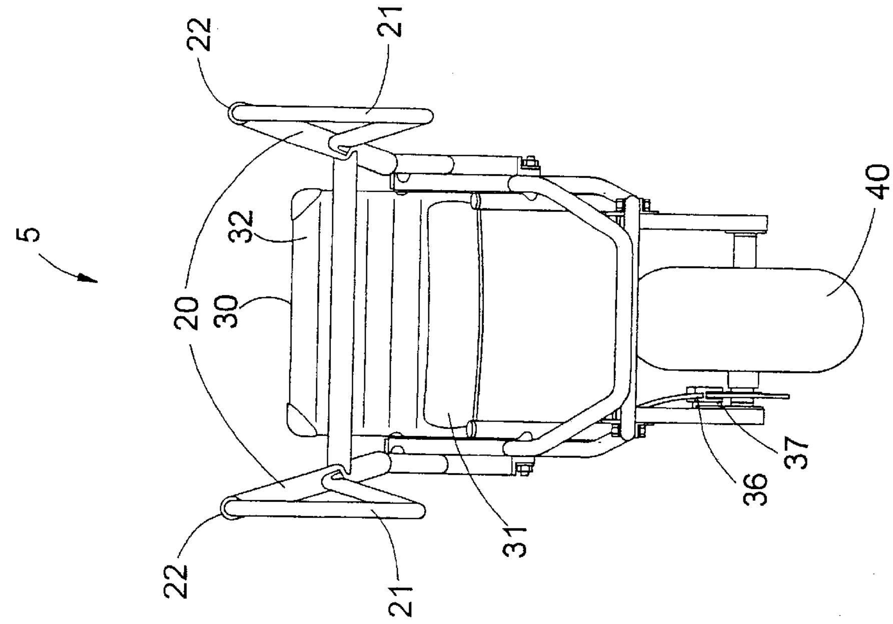
FIG. 5B is a front view of the mountain chair in accordance with an embodiment of the invention.
Figure 6:
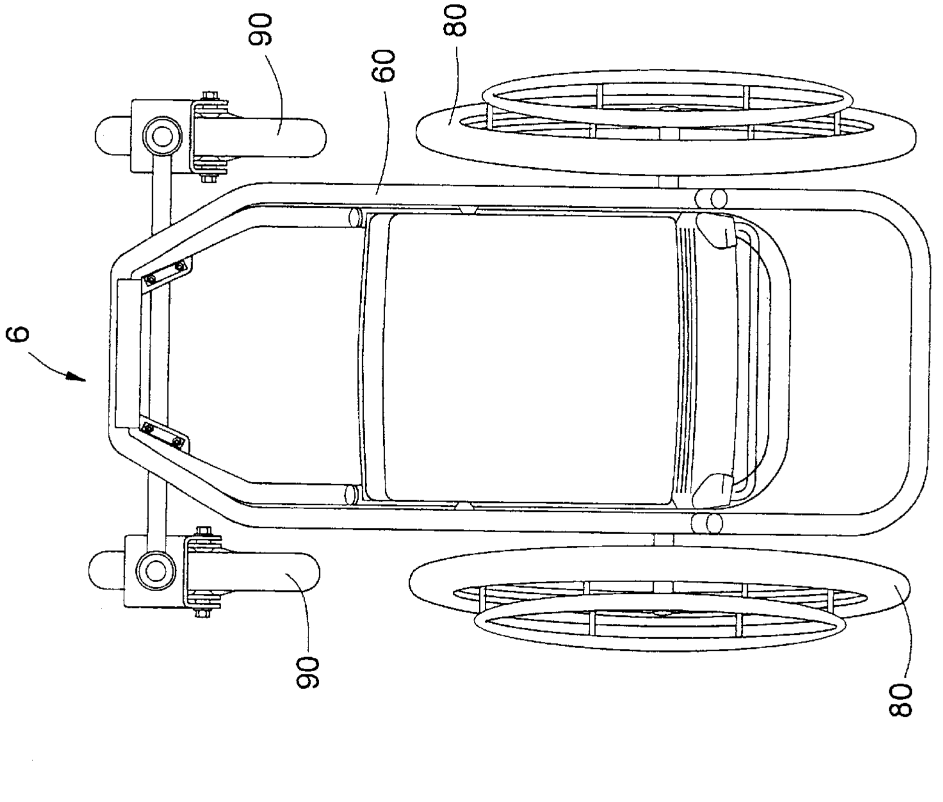
FIG. 6 is a plan view of a four-wheeled wheelchair which is convertible to a mountain chair in accordance with an embodiment of the invention.

FIG. 5A shows a back view of the mountain chair 5. The braking means for stopping or slowing the mountain chair is illustrated in FIGS. 5A and 5B. The disc 36 mounted to wheel 40 is depicted. Additionally, the caliper 37 mounted on the wheel frame 42 can be seen which is actuated by the lever 19 (as shown in FIG. 1) located on at least one back elongated handle member. Similarly, FIG. 5B illustrates a front view of the mountain chair.

In an embodiment of the invention, a single wheeled mountain chair is convertible to a four-wheeled wheelchair 6, as shown in FIGS. 6 through 9. The conversion is accomplished by removing the elongated handle bars 10 and 20 and the wheel 40 from the mountain chair, and attaching front wheels 90 and rear wheels 80 to attachment points on the frame 60.

Figure 7:
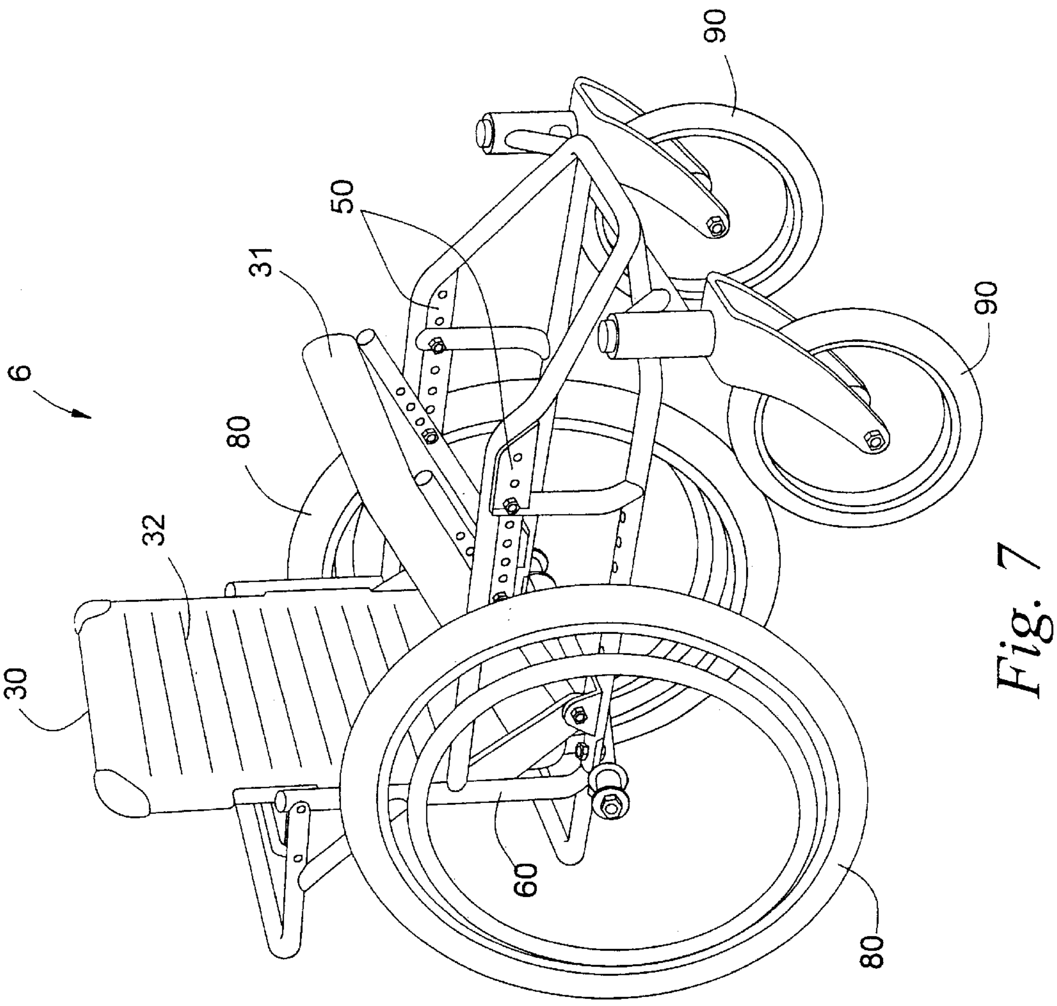
FIG. 7 is a perspective view of the mountain chair converted into a four-wheeled wheelchair in accordance with an embodiment of the invention.
Figure 8:
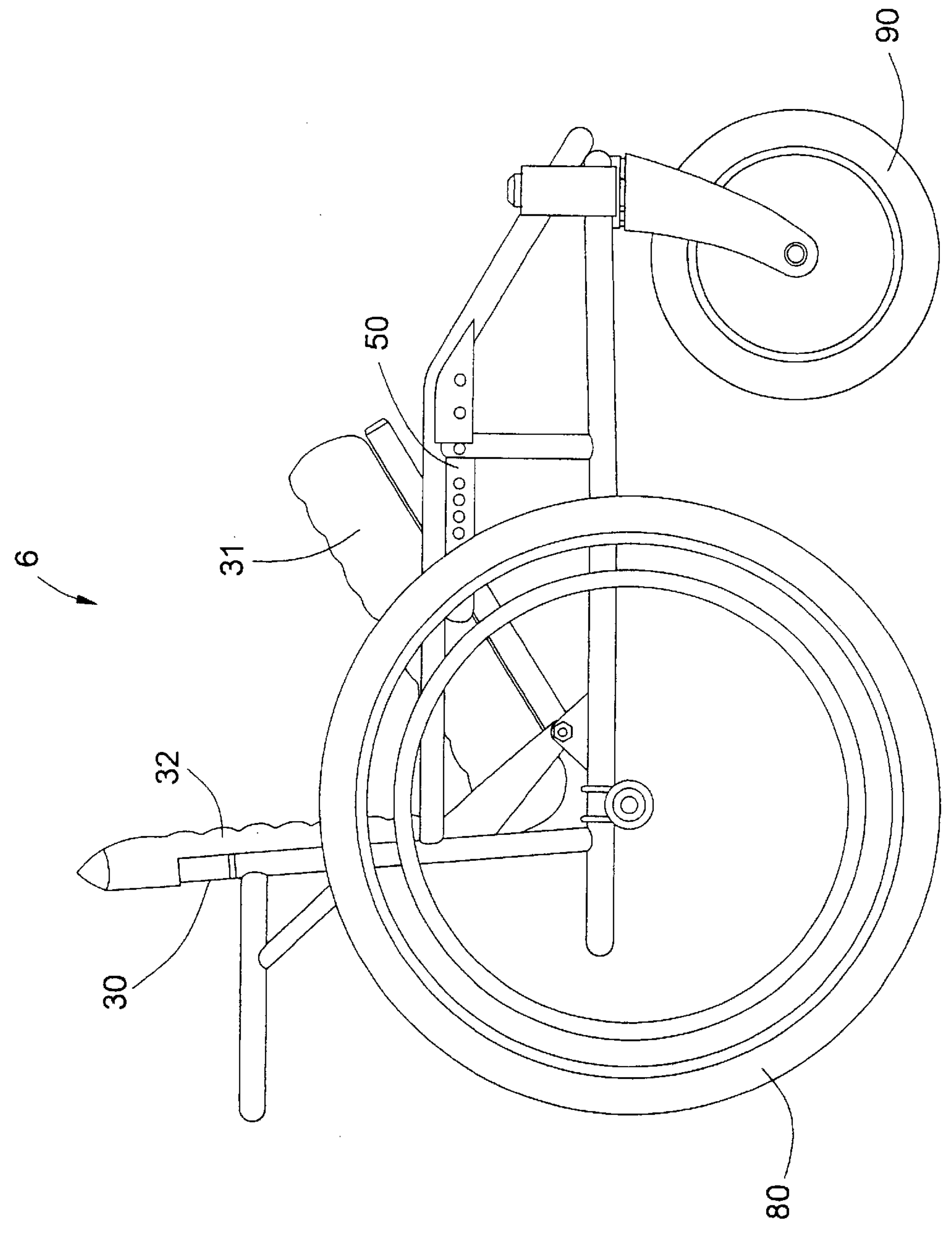
FIG. 8 is a side view of the completed conversion of the mountain chair to a four wheeled wheelchair in accordance with an embodiment of the invention.
Figure 9:
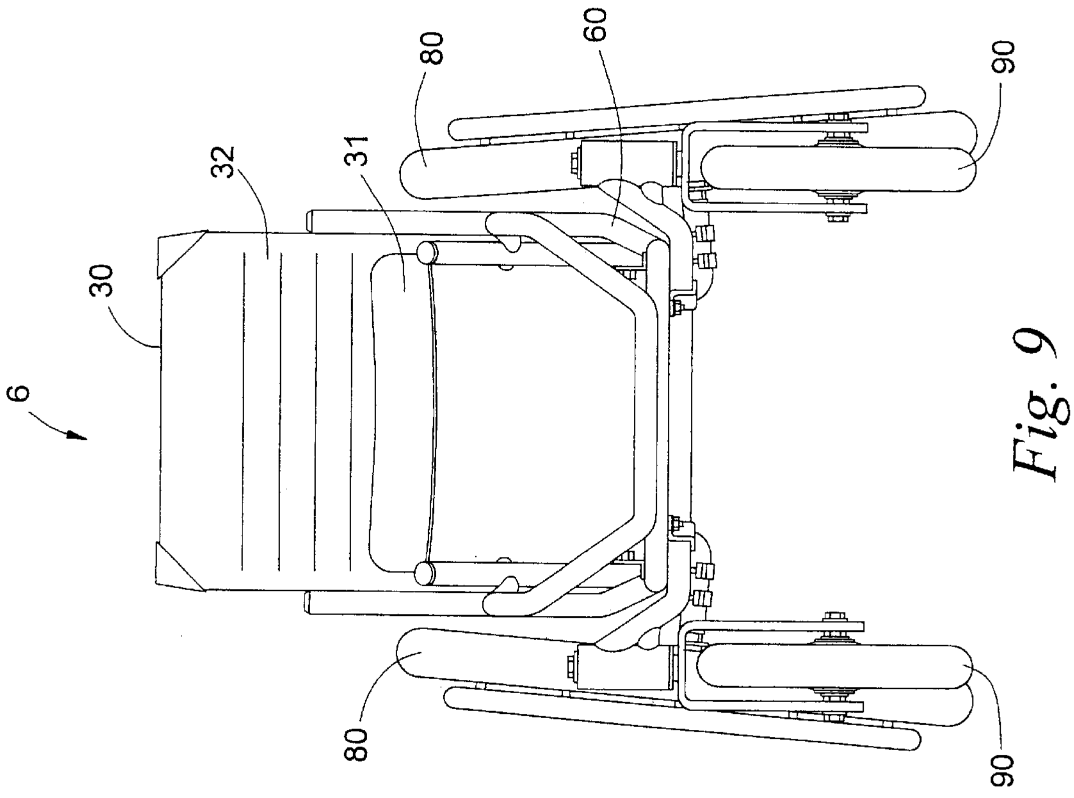
FIG. 9 is a perspective view of the completed conversion of the mountain chair to a four wheeled wheelchair in accordance with an embodiment of the invention.

The rear wheels 80 are adjustably attached to the frame 60 and are "quick-release" wheels. An angled canted axle has been found to function satisfactorily. Quick-release front wheels 90 are adjustably attached to the frame 60. A hemispherical bracket 50 as shown in FIGS. 7 and 8 provides adjustability functions.

Because of the method by which the wheels 80 and 90 are attached to the chair 30, the converted wheelchair 6 has not only a low center of gravity but an extremely high clearance over rocks and other obstacles. A rear axle tube (not shown) can be installed at the rear of the mountain chair 5 to accept quick-release wheel chair wheels and an axle assembly (not shown) with smaller, caster type wheels at the front of the mountain chair 5. This feature allows the rider the option of having a four-wheeled wheelchair 6. For instance, a four-wheeled wheelchair conversion allows the rider to move around the camp without having to haul along a second wheel chair. Further, the four-wheeled wheelchair can include "knobby" mountain bike tires as well as a good set of brakes. Mounts (not shown) are designed and fitted on the handlebar frame to carry the wheels and axle assemblies when traveling in the single wheel mode.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

I claim:

1. A wheel chair for transporting a rider and cargo, comprising:

a chair having a seat portion and a back portion;

a pair of elongated handle members arranged in a parallel spaced relation mounted on opposite sides of and secured to a frame which encases the chair such that the elongated handle members function as a pair of protective rails, enclosing the rider;

a wheel positioned centrally below the seat portion of the chair; and a braking means attached to the wheel and a wheel frame for slowing and stopping the wheel chair.

2. The wheel chair of claim 1 wherein the means for stopping includes a disc mounted to the wheel and at least one caliper mounted on the wheel actuated by a lever located at an end of one of the elongated handle members.

3. The wheel chair of claim 1 wherein the wheel is slidably mounted on a rail and located below the seat portion of the chair so as to provide an adjustable center of gravity.

4. The wheel chair of claim 1 wherein the chair is constructed from plastic.

5. The wheel chair of claim 1 wherein the seat portion is bucket-shaped.

6. The wheel chair of claim 1 wherein the wheel is an all terrain vehicle tire, rigidly mounted.

7. The wheel chair of claim 1 wherein the elongated handle members are removably attached and adjustable.

8. The wheel chair of claim 1 further comprising an extendable back rest.

9. The wheel chair of claim 1 further comprising a pair of elongated handle member extensions removably attached to a distal end portion of the elongated handle members.

10. The wheel chair of claim 1 wherein the chair includes an adjustable foot rest.

11. A method for transporting a handicapped person over mountainous terrain, the method comprising the steps of:

placing a handicapped person in a wheel chair apparatus having a chair with a low center of gravity, a pair of elongated handle members extending forwardly and backwardly from the chair, the elongated handle members having a front end and a back end, and a wheel located below the chair;

locating a first operator at the front end of the elongated handle members and a second operator at the back end of the elongated handle members;

gripping the front end of the elongated handle members by the first operator;

gripping the back end of the elongated handle members by the second operator;

lifting the wheel chair apparatus containing the handicapped person by having the first operator raise the front end of the elongated handle members with the wheel chair apparatus behind the first operator and the second operator raise the back end of the elongated handle members with the wheel chair apparatus in from of the second operator simultaneously; and leading the wheel chair apparatus by having the first operator walk forward and the second operator follow in the same direction.

12. The method of claim 11 further comprising the step of:

braking the wheel chair apparatus by having one or more persons selected from the group consisting of the first operator, the second operator and the handicapped person, squeeze a lever for slowing or stopping the wheel.

13. A wheel chair for transporting a handicapped person in a seated position, comprising:

a chair having a seat portion and a back portion;

a rail located below the seat portion;

a frame encasing the chair;

a pair of elongated handle members, each having a front end and a back end, the pair of elongated handle members arranged in parallel spaced relation mounted on opposite sides of and secured to the frame such that the elongated handle members function as a pair of protective rails, enclosing the handicapped person;

manually graspable extensions removably attached to the front ends and the back ends of the elongated handle members;

a wheel slidably mounted on the rail located below the seat portion of the chair, the wheel situated below the chair to effect a low center of gravity; and a braking means for slowing and stopping the wheel chair.

* * * * *